(12) United States Patent
Sartor et al.

(10) Patent No.: US 8,224,126 B2
(45) Date of Patent: Jul. 17, 2012

(54) MOTION COMPENSATED TEMPORAL INTERPOLATION FOR FRAME RATE CONVERSION OF VIDEO SIGNALS

(75) Inventors: Piergiorgio Sartor, Fellbach (DE); Volker Freiburg, Stuttgart (DE); Frank Moesle, Stuttgart (DE); Oliver Erdler, Ostfildern-Ruit (DE)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 12/409,018

(22) Filed: Mar. 23, 2009

(65) Prior Publication Data

US 2009/0245694 A1    Oct. 1, 2009

(30) Foreign Application Priority Data

Mar. 28, 2008    (EP) .................................. 08153558

(51) Int. Cl.
     *G06K 9/32*      (2006.01)
     *H04N 1/46*      (2006.01)
(52) U.S. Cl. ........................................ 382/300; 358/525
(58) Field of Classification Search .................. 382/260, 382/300, 305, 312, 278; 345/606, 612, 613; 358/1.9, 525
See application file for complete search history.

(56) References Cited

U.S. PATENT DOCUMENTS

| | | | | |
|---|---|---|---|---|
| 5,162,907 A | * | 11/1992 | Keating et al. | 375/240.16 |
| 5,337,154 A | * | 8/1994 | Dorricott et al. | 348/448 |
| 5,784,114 A | * | 7/1998 | Borer et al. | 348/452 |
| 7,983,339 B2 | * | 7/2011 | Francois et al. | 375/240.15 |
| 2004/0091046 A1 | | 5/2004 | Akimoto et al. | |

FOREIGN PATENT DOCUMENTS

| | | |
|---|---|---|
| GB | 2 283 385 A | 5/1995 |
| WO | WO 2005/004479 A1 | 1/2005 |

OTHER PUBLICATIONS

Ravi Krishnamurthy, et al., "Frame Interpolation and Bidirectional Prediction of Video Using Compactly Encoded Optical-Flow Fields and Label Fields", IEEE Transactions on Circuits and Systems for Video Technology, IEEE Service Center, vol. 9, No. 5, XP011014592, Aug. 1, 1999, pp. 713-726.

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

The present invention relates to a method for interpolating a subpixel at an interpolation position, which is situated in the chronological order between two source frames. Thereby the calculation of the interpolated subpixel's value is based on the value of the pixels of the two source frames and additional weighting coefficients, which are based on the motion vectors correlating the two source frames.

14 Claims, 7 Drawing Sheets

MOTION COMPENSATED TEMPORAL INTERPOLATION FOR FRAME RATE CONVERSION OF VIDEO SIGNALS

FIELD OF INVENTION

The present invention relates to frame rate conversion of captured motion pictures, in particular of video signals.

One essential parameter of a moving image sequence as a visual presentation is the image change rate or also said frame rate, whereby several standards are in use today and base on 24 Hz, 25 Hz, 30 Hz, 50 Hz, 60 Hz and more, respectively.

The image change rate fundamentally affects how "fluid" the motion it captures will look on the screen. Moving image material can be roughly divided into two groups: the so called film-based material, where the image of the scene is captured by camera for example 24 times a second, and the video-based material, where the image is captured for example 50 or 60 times a second.

Normally it can be assumed that the higher the captured frame rate, the better and more fluid the captured motion will look on screen. Nevertheless slower frame rates are still used to capture motion and movies due to the unique artistic and nostalgic impression arising exactly from the slow image change rate.

STATE OF THE ART

The frame rate conversion is usually accomplished in several ways and eventually implicates the trade off of computational effort and memory usage vs. quality.

But the problem of converting a video signals from one frame rate to another is becoming more and more important due to other several facts.

First of all, the existence of different video formats, which differ also for the frame rate (like e.g. 24 fps (frames per second), 50 fps, 60 fps), causes the necessity to convert from one frame rate to another frame rate.

Second, display devices like for example a cathode ray tube (CRT) or a liquid crystal display (LCD) work usually better with higher frame rates (like 75 fps, 100 fps, 120 fps). For these reasons it is important to provide high quality methods capable to convert from one frame rate to another, favourably from a slow frame rate to a fast frame rate.

SUMMARY OF THE INVENTION

The proposed method uses motion information, coming from a motion estimation process, in order to create new frames, in the proper temporal position, and achieve the wanted conversion ratio.

The target is to achieve an overall quality, but using constrained resources (memory and computational capabilities) and a different architecture compared to the state of the art.

The present invention relates to a method for interpolating at least one subpixel at an interpolation position, said interpolation position being situated in the chronological sequence between at least two source frames, whereby said at least two source frames comprise a plurality of pixels and/or subpixels, respectively, and are correlated with each other based on at least one forward motion vector and at least one backward motion vector, said forward and backward motion vector pointing from at least one origin pixel or subpixel of the frame preceding said interpolation position to at least one target pixel or subpixel of the frame succeeding said interpolation position and vice-versa, respectively, whereby said method comprises the steps of identifying at least one of said at least one forward motion vector and at least one of said at least one backward motion vector respectively projecting at least one subpixel at the respective same spatial coordinate at said interpolation position, determining the values of the origin and target pixels or subpixels pointed by said identified motion vectors, respectively, and calculating the value of said at least one subpixel at said spatial coordinate based on said values of origin and target pixels or subpixels of said identified motion vectors and based on respective weighting coefficients, said weighting coefficients being based on the attributes of said identified motion vectors.

Favourably, said attributes comprise a post-match result of said origin and target pixels of the forward and/or backward motion vector, respectively.

Favourably, said post-match result is the best, when said origin and target pixels or subpixels are identical.

Favourably, said weighting coefficients are based on said interpolation position, respectively.

Favourably, said weighting coefficients are based on a sigmoid shaped function, respectively.

Favourably, said attributes comprise the divergence between said forward and backward vectors.

Favourably, said weighting coefficients are processed based on a projection count, respectively, said projection count representing the respective number of forward or backward vectors at said spatial coordinate of said interpolation position.

The present invention also relates to an apparatus for interpolating at least one subpixel at an interpolation position, said interpolation position being situated in the chronological sequence between at least two source frames, whereby said at least two source frames comprise a plurality of pixels and/or subpixels, respectively, and are correlated with each other based on at least one forward motion vector and at least one backward motion vector, said forward and backward motion vector pointing from at least one origin pixel or subpixel of the frame preceding said interpolation position to at least one target pixel or subpixel of the frame succeeding said interpolation position and vice-versa, respectively, whereby said apparatus is operable to receive at least one of said forward and said backward motion vector, at least said two source frames and said interpolation position and to output said interpolated at least one subpixel at said interpolation position.

In addition, said apparatus comprises an identification structure operable to identify at least one of said at least one forward motion vector and at least one of said at least one backward motion vector respectively projecting at least one subpixel at the respective same spatial coordinate at said interpolation position, a determination structure operable to determine the values of the origin and target pixels or subpixels pointed by said identified motion vectors, respectively, and a calculation structure operable to calculate the value of said at least one subpixel at said spatial coordinate based on said values of origin and target pixels or subpixels of said identified motion vectors and based on respective weighting coefficients, said weighting coefficients being based on the attributes of said identified motion vectors.

The present invention can be realized as a software program or a hardware implementation like e.g. in an integrated circuit. It is favourably used in television devices, cell phones, beamers or just as an embedded structure in said integrated circuit. Thereby the realization can be placed in one unit or in different units based on the structures.

DESCRIPTION OF THE DRAWINGS

The features, objects and advantages of the present invention will become more apparent from the detailed description set forth below when taken in conjunction with the drawings, wherein.

DETAILED DESCRIPTION OF THE INVENTION

In the following, several Figures are described to better illustrate the different embodiments and examples of the present invention.

Figure 1:
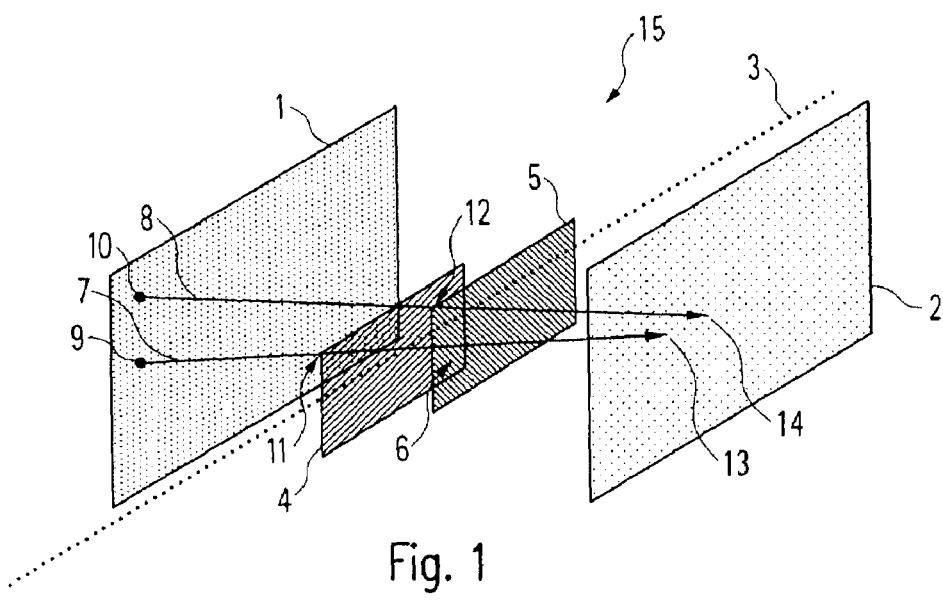
FIG. 1 shows an example of an arrangement of two frames providing two projection windows at a projection coordinate based on two vectors.

At first, FIG. 1 shows an example of an arrangement of two frames 1 and 2 and two projection windows 4 and 5, said windows 4 and 5 being placed at a projection coordinate 3 and being based on the two vectors 7 and 8, respectively. This example describes the basic principle the present invention is based on.

In view of the chronological order or from left to right, first the frame 1, then the projection windows 4 and 5 at the projection coordinate 3, also called interpolation position, and then the frame 2 are displayed. In this example, the frames 1 and 2 as well as the projected windows 4 and 5 have the same size, respectively. The projection windows 4 and 5 are both placed along the projection coordinate 3 and thus occur or are displayed at the same time. In this example, the projection windows 4 and 5 are placed right in the middle between the frame 1 and the frame 2, but can be placed anywhere between the two frames 1 and 2 based on the respective projection vectors 7 and 8 and based on the interpolation rate or frame rate. In another example, a plurality of interpolation positions are specified between said frames 1 and 2, each position displaying no or at least one projected window.

Figure 11:
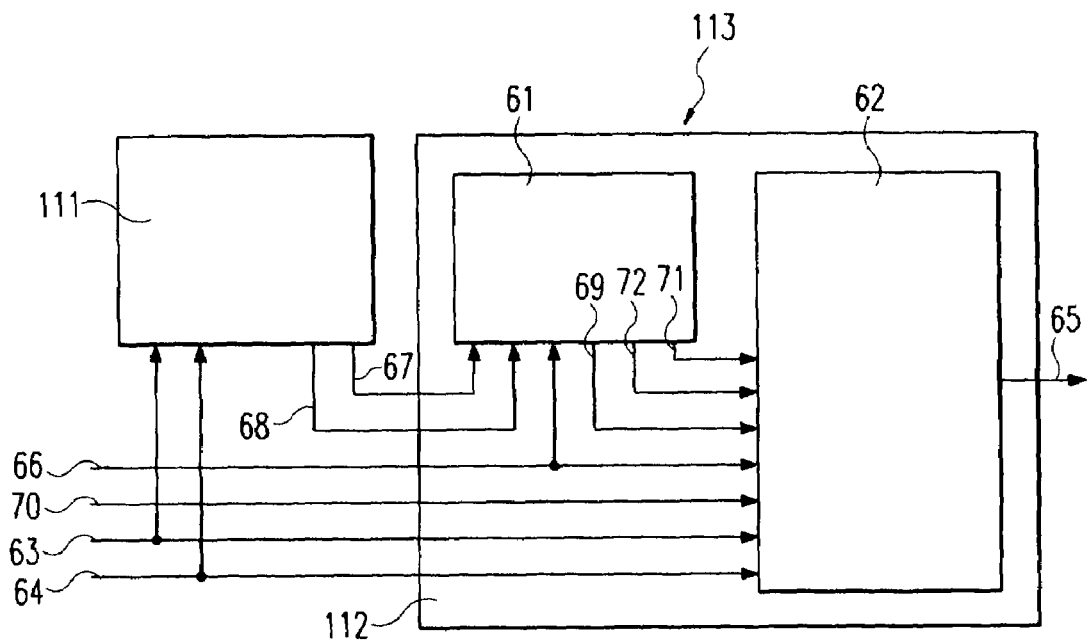
FIG. 11 shows an example of a frame rate conversion device comprising an embodiment of the present invention.

The two vectors 7 and 8 are favourably provided by a previous motion estimation method, like e.g. by the device 111 shown in FIG. 11, wherein specific blocks of a first frame like e.g. in frame 1 are compared with blocks of a second frame like e.g. in frame 2 against each other and are related by a motion vector in case that the two blocks are equal or similar to each other. These motion vectors 7 and 8 describe a motion or a displacement of said at least one block or pixel or sub-pixel between the frame 1 and 2, respectively. So it is clear that the projected window shows e.g. a copy of the block, pixel etc. originating from frame 1 at an intermediate stop. Thus, the pixel at the interpolation position is related with the pixel of the frame 1 by said vector.

In another example, the pixel value could be gradually interpolated from the pixel value of frame 1 to pixel value of frame 2; e.g. the pixel value of frame 1 is dark red and the pixel value of frame 2 is light red, so that the interpolated pixel will have medium red as pixel value. In this case, the information of the motion vector would not be enough, since the motion vector would only copy the original block to the interpolation position. But it is possible to copy both the original block and the target block being selected by the motion estimation method to respectively serve as the end point of the motion vector at the interpolation position and interpolate the pixel values as mentioned above.

In detail, the motion vectors 7 and 8 comprise a starting point 9 and 10 and an ending point 13 and 14 as well as a point of contact with the projection windows 4 and 5, respectively. In this case all the vectors like vector 7 and 8 which are part of the vector field 15 between the frames 1 and 2 have a reference contact at the upper left corner of the blocks in frame 1 and 2, respectively. This is particularly shown by the respective point of contact 11 & 12 of the vector with its respective projection window.

In another example, the point of contact can be situated in the centre of the window or at another corner; eventually at any point of the window. Of course, the reference point could also be situated at a constant distance outside the window, e.g. 10 pixels above the right upper corner, whereby this reference point can apply to all windows including and in between the two frames A & B of the respective vector.

The planes of the frames 1 and 2, the projection windows 4 and 5 as well as the blocks of the frames 1 and 2 (not shown), said block being part of said frames 1 and 2, are all parallel to each other.

Figure 2:
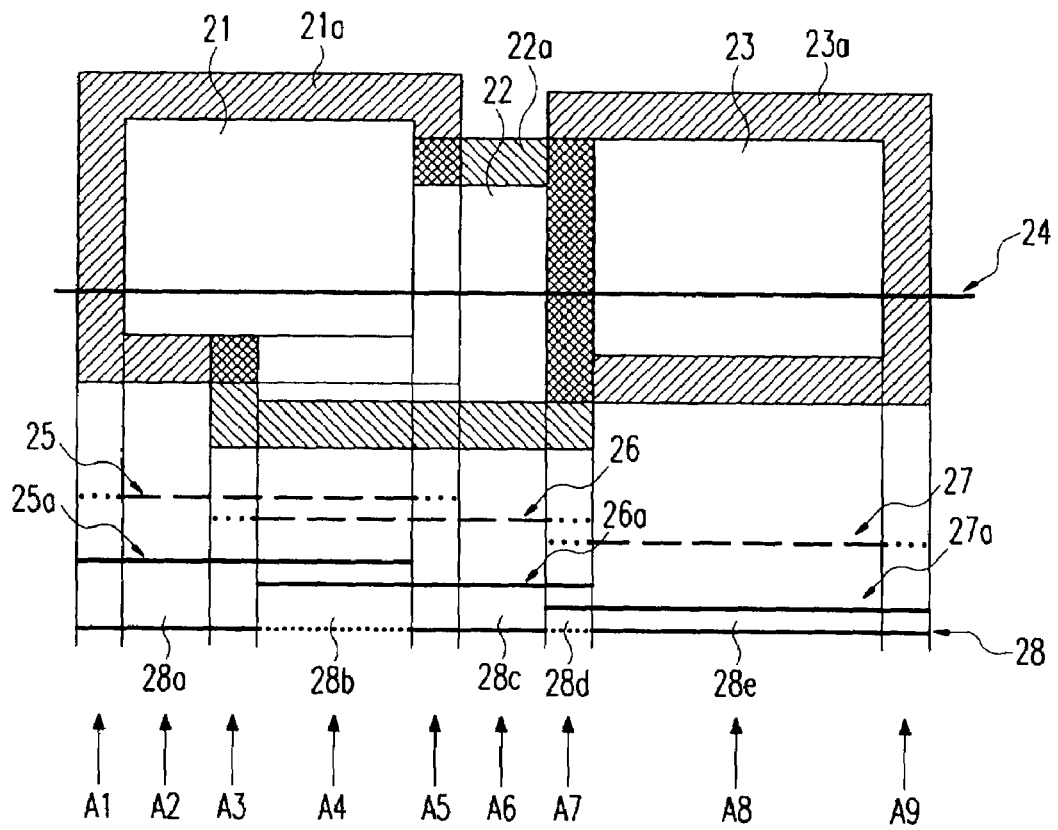
FIG. 2 shows an example of an arrangement of three projection windows based on three different vectors and their respective priority.

Regarding the extended projection window shown in FIG. 2, this approach will probably increase the conflict count; care must be taken in order to reduce anomalies in the projected vector field.

Some workarounds can be implemented. One option could be to distinguish between real projections and extended ones. As shown in e.g. FIG. 2 to 5, respectively, a distinction is made between real projection and extended projection. The real projection can have priority over the extended one. This means that wherever a vector of the real projections is present, the vectors of the extended ones are ignored.

Furthermore, extending the projection window will allow covering gaps. The extension could be several pixels broad, but experimental observations show that a too large extended window might lead to visual artefacts.

Nevertheless, it could happen due to very fast motion that large areas with no vectors will appear. In this case several options are available:

Option 1—One is to fill these areas with zero (default) vectors.

Option 2—Another possibility is to use, in these areas, old and previous vectors. These could come from a previous projected frame or line. Memory considerations will lead to use the previous line, which is anyway stored in memory, while the previous frame needs to be explicitly stored, resulting in higher memory usage.

Option 3—The neighbouring vectors can be used, which are spatially adjacent to the large area.

Option 4—Unprojected vectors can be used, which are vectors merely pointing from a position (x,y) of frame A to the same position (x,y) but of the frame at the interpolated position or vice-versa from B to the frame at the interpolated position.

In order to get the vector which allows to access video data in A and in B, it will be necessary to search which of the vectors is crossing the position (x,y) at the interpolation position.

This operation is called "projection" and the resulting vector is the "projected vector".

In case of the "un-projected vector", a vector is taken which belongs to the position (x,y) of frame A and is used for the position (x,y) of the frame at the interpolation position.

Since for each position (x,y) of frame A, one and only one vector is available, this method will have the advantage to provide exactly one vector for the position (x,y) of the frame at the interpolation position.

The disadvantage is that the vector will be correct only in case of no motion (zero vector), which is often an acceptable solution.

These vectors are called "un-projected", since they belong to the temporal position of frame A and are independent from the temporal position of the frame at the interpolated position.

To summarize, "projected vectors" are the ones associated to the spatial-temporal position where the interpolation takes place, i.e. (x,y) of the frame at the interpolation position, when available. On the other hand, "un-projected vectors" are the one used in (x,y) of the frame at the interpolation position, but belonging to (x,y) of frame A, that is, as mentioned above, they're independent from the temporal interpolation position.

The projection scheme described in FIG. 1 is intended to provide reasonable results without performing any vector checks using matching criteria. This allows to process only vectors in the vector projector e.g. 61 in FIG. 6, without dealing with video data, thus reducing memory and bandwidth.

Due to this reason, the vectors quality may not be optimal and a post-matching verification may be required. In this case, it could be convenient to perform the match inside the interpolator, since this device already comprises the video data. In order to do this, at least two different vector types need to be passed, from the projector, to the interpolator. These are usually one forward and one backward projected vectors.

In another example, the calculated vectors are averaged using the projection conflict counters and the counters themselves are transmitted to the interpolator.

Note that this averaging procedure results in a filtering of the projected vector field.

FIG. 2 shows an example of an arrangement of three projection windows 21, 22 and 23, also called blocks, which are based on three different vectors.

The word "different" means that the vectors might have different origin points, but might nevertheless point in the same direction; so they are parallel to each other. Parallel vectors might describe the movement of two different blocks from frame A to B.

Or the vectors have the same origin points, but different directions. For example zooming into a scene or an explosion might create of one original block of frame A a plurality of copied blocks in frame B.

Or they are completely different in the origin point and their direction meaning not being parallel. There is a plurality of possibilities how movement can be described by means of motion vectors and their distribution.

These three blocks 21, 22 and 23 in FIG. 2 comprise extended borders or areas 21a, 22a, 23a and are based on a first, second and third vector, respectively, whereby said areas and/or blocks partially overlap with each other. Said vectors are favourably different to each other and originate from a motion estimation method as described in FIG. 1. The blocks 21, 22 and 23 can correspond to the projection windows 4 and 5 described in FIG. 1, respectively.

A projection line 24 is shown which horizontally crosses the blocks 21, 22 and 23 and their respective extended areas 21a, 22a and 23a. In addition, the projection line 24 is divided in the sections A1 to A9 and is parallel to the longer side of the blocks. The projection line 24 rather helps to illustrate the different sections A1 to A9 and to identify the conflicts between different vectors at specific sections.

Seven lines 25, 26, 27, 25a, 26a, 27a and 28 are displayed below the shown blocks 21, 22 and 23 and the extended areas 21a, 22a and 23a, whereby said lines are parallel to the projection line 24.

The lines 25, 26 and 27 show the availability of the respective first, second and third vector, whereby the vector might be the forward or backward vector 67/68 or the projected forward or backward vector 71/72, respectively. Normally each coordinate at the interpolation position has both a forward and a backward vector assigned to it. The vectors can also be projected ones. The dotted lines of the respective availability lines 25 to 27 indicate that the projection line 24 crosses the extended area of a specific block like e.g. in section A9 the extended area 23a of the third vector. The dashed lines in between the dotted lines, which are also part of the availability lines 25 to 27, respectively show the sections, where the projection line 24 crosses the respective blocks 21 to 23, like e.g. in section A8.

In the example of the present invention shown in FIG. 2, the vectors, which are represented by the respective blocks 21 to 23, have a higher priority than the vectors, which are represented by the respective extended areas 21a to 23a of a specific block. The lines of priority 25a, 26a and 27a of the respective vectors indicate the sections of the respective blocks 21 to 23, where the projection line 24 crosses said respective blocks and where the vector represented by the extended area is not overlapped by a neighbouring block.

For example, when two different priority lines concurrently exist in a section like e.g. in section A4 or A7, a conflict between two different vectors can be predicted. In section A4 the first vector and the second vector have the same priority and in section A7 the second vector and the third vector have the same priority.

The priority line 25a is displayed throughout the sections A1 to A4, the priority line 26a throughout the sections A4 to A7 and the priority line 27a throughout the sections A7 to A9. Based on these priorities the projection line 24 can be divided into sections representing a single vector or representing a conflict between two vectors as described by the projection conflict line 28.

The projection conflict line 28 indicates single vector projections and conflicts between two vectors and comprises the single projection division 28a, the conflict division 28b, the single projection division 28c, the conflict division 28d and the single projection division 28e. The single projection division 28a represents that in this section favourably the first vector, in the single projection section 28c favourably the second vector and in the single projection section 28e the third vector are used, respectively. In the sections 28b and 28d corresponding to the respective sections A4 and A7, the corresponding vectors might later be processed and filtered to determine which vector fits better or is more appropriate at the interpolation position. Or a completely different vector can be used to be implemented at this position, replacing the other at least two vectors.

It is emphasized that the form of the projected window is not restricted to the rectangle and it is not necessary that all the projected windows are required to be of the same size. Moreover, the extended areas of the respective blocks can differ from each other; specifically that e.g. the extended area of one block is broader than the extended area of another block. Also not every block is required to have an extended area.

Figure 3:
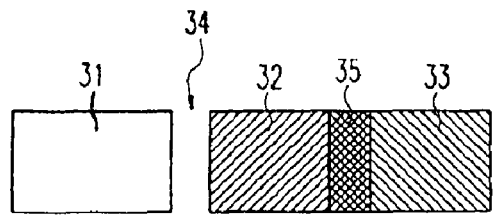
FIG. 3 shows another example of an arrangement of three projection windows.

FIG. 3 shows another example of an arrangement of three projection windows 31, 32 and 33 which can correspond with the projection windows respectively shown in FIGS. 2 and 1. The windows 31 to 33 represent a first, second and third vector, respectively. All three projection windows have the same size and are rectangle-like shaped. The blocks 31 to 33 are aligned along the top side, whereby a gap 34 exists between the block 31 and the block 32.

The gap 34 is equidistant to the two blocks 31 and 32, meaning that the short sides of the blocks 31 and 32 facing each other are parallel. It is emphasized, that no vector is assigned to the coordinates within the gap 34.

Moreover, the block 32 and the block 33 overlap each other. The area wherein the two blocks 32 and 33 overlap each other is defined as middle overlap 35 and indicates a conflict between the second vector and the third vector. In this case, the middle overlap 35 is rectangle-like shaped and is as long as the rectangle block 32 or 33 is broad.

Figure 4:
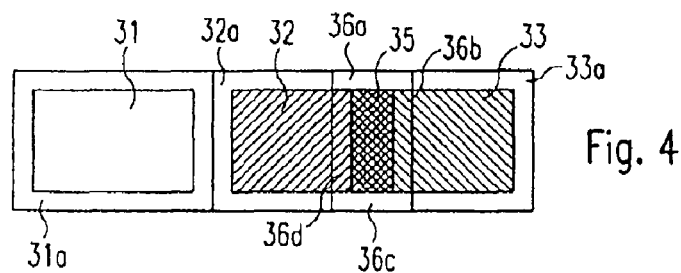
FIG. 4 shows an example of an arrangement of three extended projection windows.

FIG. 4 shows an example of an arrangement of three extended projection windows based on the example shown in FIG. 3, wherein the extended projection windows comprise a block 31, 32 or 33 and an extended area 31a, 32a or 33a, respectively. The properties and the attributes as well as the blocks 31, 32 and 33 themselves correspond to the ones shown and described in FIG. 3.

Due to the extended area 31a and 32a, the gap between the two blocks 31 and 32, previously shown in FIG. 3, has vanished and all the pixels which previously had no motion vector assigned to and are situated between said blocks 31 and 32 have now been assigned to either one of the vectors of block 31 or 32.

Due to the extended areas 32a and 33a, the overlap of the two blocks 32 and 33 has been extended, too. Now the overlapping area not only comprises the middle overlap 35 as described in FIG. 3, but also the upper overlap 36a, wherein a conflict between the second and third vector exists, the right overlap 36b, wherein a conflict of the second vector of the extended area 32a and a third vector of the block 33 exists, a lower overlap 36c, wherein a conflict between the second and third vector in the extended area exists, and a left overlap 36d, wherein a conflict between the third vector of the extended area 33a and the second vector of the block 32 exists.

In case, the vectors of the respective blocks 32 and 33 have a higher priority than the vectors of the extended areas 32a or 33a, the vector of the block 33 has the priority in the right overlap area 36b and the vector of the block 32 has the priority in the left overlap area 36d.

It is emphasized that the extended areas 31a, 32a and 33a have the same area thus the same width, but in another example the extended area 31a could be broader than the extended area 32a. Also the present invention is not restricted to uniformly extended areas; the extended area could only exist on one, two or three sides.

Figure 5:
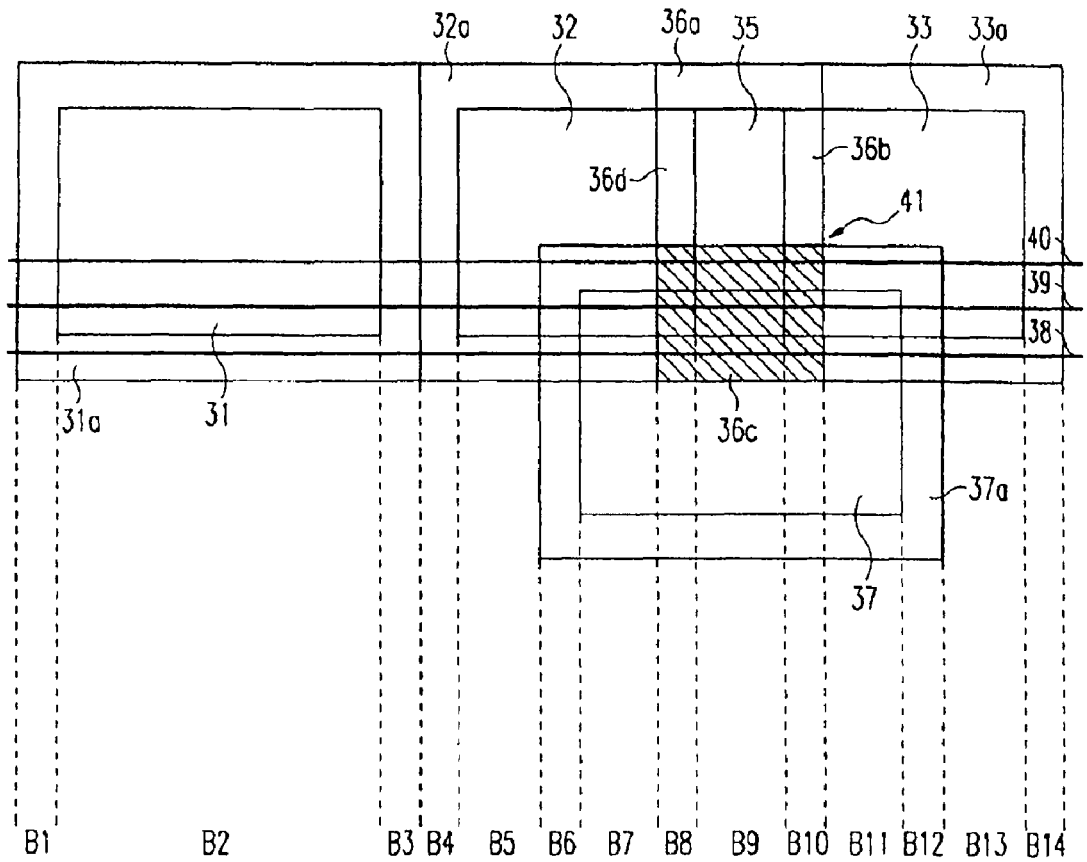
FIG. 5 shows another example of an arrangement of four projection windows based on four different vectors and their respective priority.

FIG. 5 shows another example of an arrangement of four projection windows, whereby said windows are based on four different vectors and have their respective priorities and properties. The four projection windows comprise the blocks 31, 32, 33 and 37 and the respective extended area 31a, 32a, 33a and 37a, respectively. Also the same overlap areas 35, 36a to 36d as shown in FIG. 4 are displayed in FIG. 5. In addition, a three-vector conflict area 41 is shown which originates due to the overlapping of the fourth projection window 37 & 37a with the second projection window 32 & 32a and the third projection window 33 & 33a.

There are three projection lines 40, 39, 38 shown in FIG. 5, which are parallel to each other and, like the projection line 24 in FIG. 2, will help to analyze the priority of the different vectors based on the projection windows 31 & 31a, 32 & 32a, 33 & 33a and 37 & 37a.

The first projection line 38 is crossing along the extended area of the blocks 31, 32 and 33 at the bottom and crosses in the sections B6 to B12 the area of both the block 37 and the extended area 37a. The only conflict in this projection line due to priority is provided in the sections B6 and B12, where the vector of the extended area of the block 37 encounters the vector of the extended area 32a and 33a, respectively. In the sections B1, B2 and B3 the vector of the block 31 has the priority, in the sections B4 and B5 the vector of the block 32 has the priority, in the sections B7 to B11 the vector of the block 37 has the priority and in the sections B13 and B14 the vector of block 33 has the priority.

In the second projection line 39a conflict exists in the sections B7 to B11, whereby at least two vectors generate a conflict. In the sections B1 to B3 the vector of block 31 has the priority, in the sections B4 to B6 the vector of the block 32 has the priority and in the sections B12 to B14 the vector of block 33 has the priority. In the sections B7 and B8 the second vector and the fourth vector are in conflict, in the sections B10 and B11 the third vector and the fourth vector are in conflict and in the section B9 the second, third and fourth vector are in conflict.

In the third projection line 40, only in the section B9 there is a conflict between the vector of the block 32 and the vector of the block 33. Moreover, in the sections B1 to B3 the vector of the block 31 has the priority, in the sections B4 to B8 the vector of the block 32 has the priority and in the sections B10 to B14 the vector of the block 33 has the priority. The explanation of the third projection line 40 corresponds to the conflict explanation shown in FIG. 4, since the vector of the extended area of the block 37 does not have the priority over either the vector of the block 32 or the vector of block 33.

Figure 6:
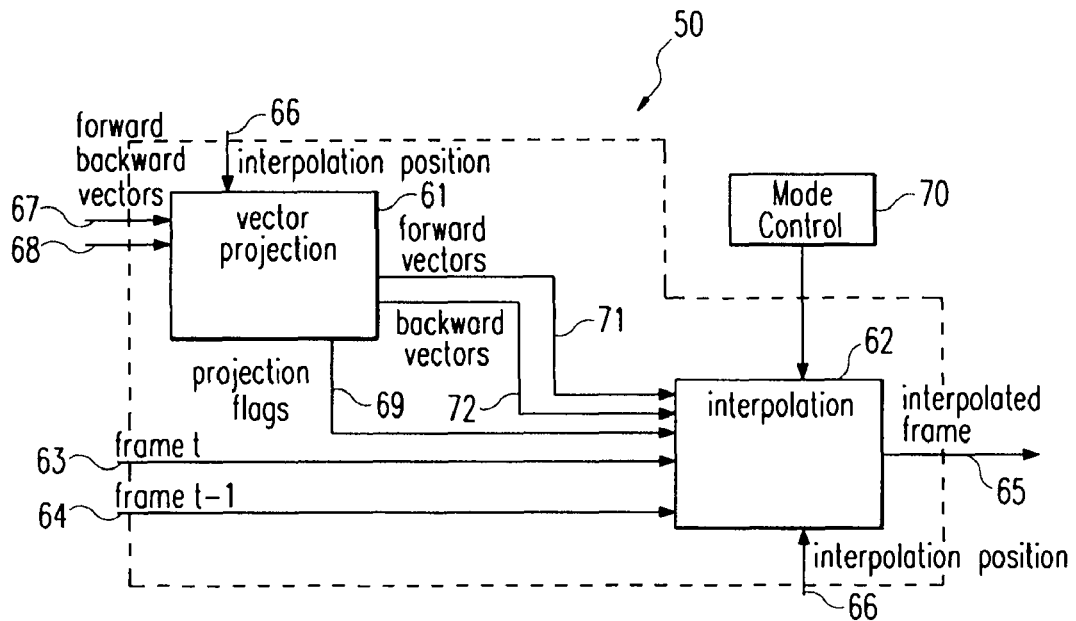
FIG. 6 shows an example of a motion compensated interpolation comprising an embodiment of the present invention.

FIG. 6 shows an example of a motion compensated interpolation device 50 comprising an embodiment of the present invention. Said motion compensated interpolation device 50 comprises a vector projection device 61 and an interpolation device 62, and is operable to receive and process forward and backward vectors 67 and 68, the interpolation position 66, signals from a mode control device 70 and the frames 63 and 64, and eventually to output an interpolated frame 65. The interpolated frame is a new inserted frame between the source frames 63 and 64, whereby the pixel values are interpolated or copied from the source frames. Also the mode control device 70 can be remote. In another example, the mode control device 70 can be part of the motion compensated interpolation device 50.

The vector projection device 61 is operable to receive and process the forward and backward vectors 67 and 68 as well as the interpolation position 66, and eventually to output the projected forward vectors 71, the projected backward vectors 72 and the projection flags 69. The data 71 and 72 can also comprise the original vectors 67 and 68. In more detail, the device 61 assigns the projected vectors to the spatial coordinates of the interpolated frame. Favourably each coordinate is assigned with a forward and a backward projected vector.

The interpolation device 62 is operable to receive and process data of the frame 63 and the previous frame 64, the interpolation position 66, the signal from the mode control device 70, the projected forward vector 71 and the projected backward vector 72 and the projection flag 69, and eventually to output the data 65 comprising the interpolated frame. In addition, the device can output any data based on the received data.

The forward and the backward vector 67 and 68 are favourably provided by a motion estimation method. The projected forward and backward vectors 71 and 72 are based on the forward and backward vector 67 and 68, respectively, whereby said projected vectors 71 and 72 are capable to describe the relation between the block of the origin frame and the projected window at the interpolation position. The word "block" can also mean at least one subpixel or pixel.

In order to improve vectors quality, a post-matching operation can be required to support vectors selection.

This operation could be performed in the vector projection device 61, but in that case said device 61 is also dealing with the video data comprising the frames 63 and 64. In another possibility as shown in FIG. 6, the post-matching can be performed in the interpolation device 62. This will also provide the benefit of bandwidth reduction.

Of course the interpolation device 62 should accept, as input vectors, at least two types, namely said projected forward and backward vectors provided by the vector projection device 61.

Figure 7:
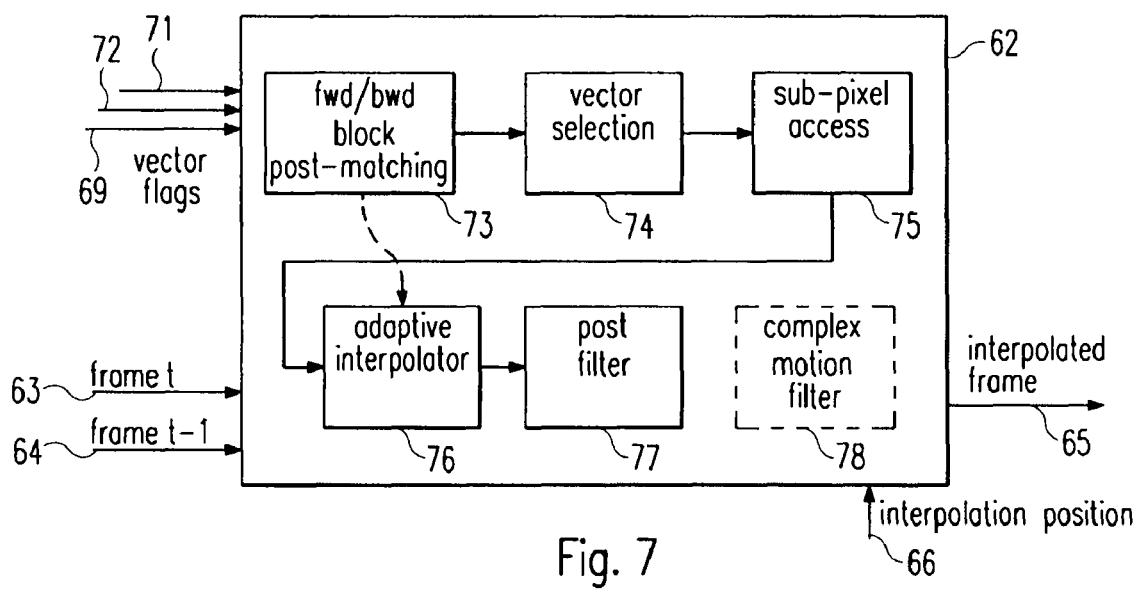
FIG. 7 shows an example of an interpolation device comprising an alternative embodiment of the present invention.

The vectors are processed to projected vectors which are assigned to coordinates at the interpolation position and then, separately, passed to the interpolation device 62 as shown in FIG. 7. This will enable the post-matching selection criteria to take place inside the interpolation device 62, where, in any case, the video data has to be read.

The mode control device 70 is operable to detect scene changes and/or bad interpolation results and to instruct the interpolation device 62 to change the interpolation method.

FIG. 7 shows an example of an interpolation device 62 comprising a detailed view of the interior of said device. The interpolation device 62 in FIG. 7 can correspond to the interpolation device 62 shown in FIG. 6.

Moreover, the interpolation device 62 comprises a forward/backward block post matching device 73, which is connected to the vector selection device 74 and/or to the adaptive interpolator device 76, said vector selection device 74 being connected to the subpixel access device 75, said subpixel access device 75 being connected to the adaptive interpolator device 76, said adaptive interpolator device 76 being connected to the post filter device 77 and eventually a complex motion filter device 78 being part of said interpolation device 62.

The interpolation device 62 is operable to receive at least the two types of vectors, the forward and backward ones, the projection flag 69 and the two source frames 63 & 64 and to select which vector may fit better for the actual interpolation to occur at said interpolation position. The selection criterion is based on the video post-match each vector provides; the vector with the best video post-match will be the chosen one. Generally the pixel values of the two frames are weighted based on the attribute of said vector and said pixels and are eventually interpolated to create a final interpolated pixel at the interpolation position.

The typical approach for the post match will be to select a block of a certain size, 2×2 or 3×3 or 4×4, pointed, in the previous and next frame, by one vector and to perform a classical SAD (sum of absolute values) on the pixel by pixel difference. The lower the SAD, the better the match is considered. The vector with better match wins and is selected for further processing.

This approach is e.g. provided by the block post matching device 73 which is operable to process the received forward and backward motion vectors 71 and 72, respectively, to determine whether the provided forward and backward vectors 71 and 72 are of good quality, meaning that the block of frame A matches or almost matches the block of frame B correlated by the respective vector. Or as described above, at least a part of a block of the origin frame are compared with at least a part of the block of the target frame to control the vector whether the pixel values of frame A really fit to or are the same as the pixel values of frame B designated by said motion vector.

The vector with better match could anyway not be a good choice, may be better than the other, but anyway wrong.

One option is to use the matching result absolute value to decide if the chosen vector is really "the best" or just "better".

This could be done by comparing the matching result against a threshold and changing the interpolation method accordingly. That is, if the match is below a certain threshold one interpolation type is used (linear), if it is above another interpolation type occurs (closest temporal neighbour).

This concept could show some flaws. First of all, a threshold must be selected; this might be a problem, in video processing, since it could be that a certain threshold fits to a certain video content well, but it does not fit to other ones. Second is that, specifically when the interpolation position is around the middle of the two source frames, a closest neighbour selection may be 100% wrong, resulting in strong visible (and annoying) artefacts.

One option would be, in this second case, to perform anyway a linear interpolation, moving the 50% probability of being 100% wrong or 100% correct, into the certainty of being 50% wrong and 50% correct.

Of course, when the interpolation position is not really in the middle, but closer to one source frame, closest neighbour interpolation might be better in case of not so good match.

The vector selection device 74 in FIG. 7 is operable to receive the match result from the block post matching devices 73 and selects the motion vector and the corresponding projected vectors which best matches the two blocks previously compared by the block post matching device 73.

Of course, the interpolation device 62 is also operable to access the data in a sub-pixel fashion as described by e.g. the subpixel access device 75.

The subpixel access device 75 is operable to receive the selected vector and calculates which subpixels have to be assigned based on the interpolation position 66 and the selected vector. For example a block or pixel of the frame A is located at the position x=0 & y=0 and the correlated block or pixel of the frame B is located at position x=10 & y=0, whereby the block or pixel of frame A and B are 10 time units apart from each other. When the interpolation position is at 6.5, the selected vector will probably assign values of the original pixel to subpixels instead to a whole pixel. In case, the interpolation position would have been an integer number between 0 and 10, like e.g. 3 or 6, then the selected vector would have determined a whole pixel.

One other option to find a fitting vector is to always perform a weighted interpolation (between previous and next frame), not a linear, but an adaptive one, as described by the adaptive interpolator device 76.

The idea is that the weight of the source pixels will depend not only on the interpolation position, but also on the matching result.

One possible weighting function is the sigmoid function.

Assuming that the interpolation position p is in the range 0.0-1.0 and the block match result m is normalized in the same range, the weight w could be:

$$w(p, m) = \frac{1}{1 + e^{-(-2 \cdot r \cdot p \cdot m + r \cdot m)}}$$

The constant r is the intended range and could be a tuning parameter.

So when the variable p goes to 1, the formula converges to $$w \to \frac{1}{1 + e^{(r \cdot m)}}$$

But when the variable p goes to 0, the formula converges to $$w \to \frac{1}{1 + e^{-(r \cdot m)}}$$

The interpolation formula is:

$$y(w) = x_p \cdot w + x_n \cdot (1-w)$$

Where $x_p$ and $X_n$ are the previous and next pixel, respectively, and y is the output result.

An example of the sigmoid function will be later described in the graph of FIG. 8.

Figure 8:
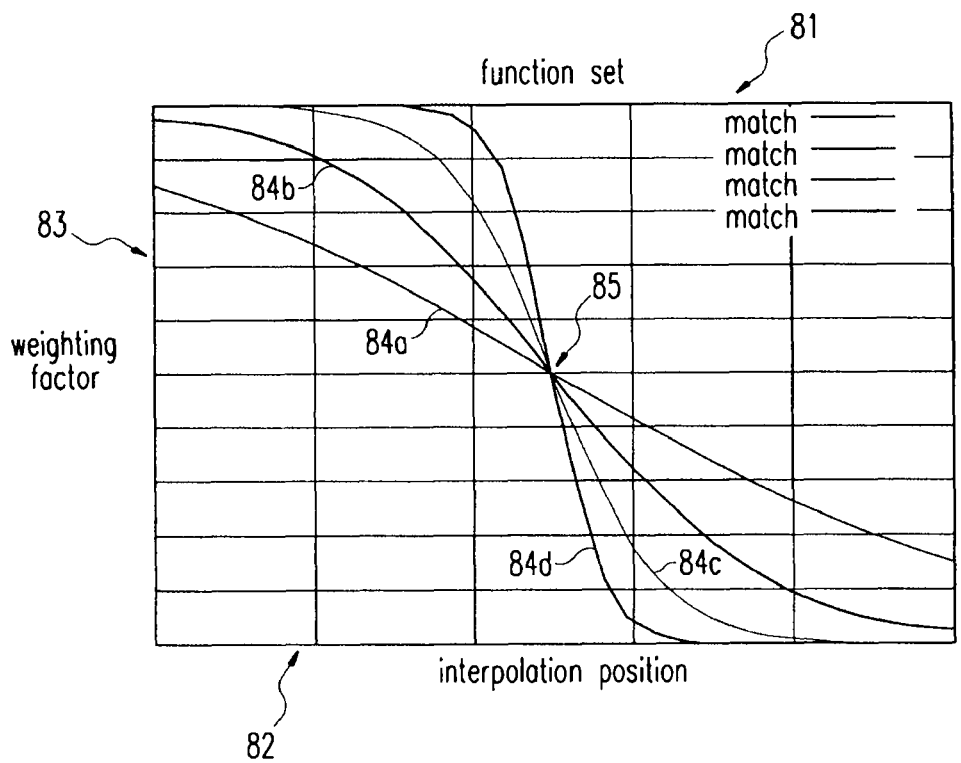
FIG. 8 shows an example of a diagram for the weighting factor based on the post-match and the interpolation position.

The adaptive interpolator device 76 is operable to determine weighting factors which are based on the post-matching and the interpolation position of the interpolated pixel, whereby the weighting is visualized in the diagram of FIG. 8.

The post filter device 77 is operable to filter the weighting factors based on the spatial distribution through out the interpolation coordinates at the interpolation position to smoothen the assigned motion vectors.

Until now, the interpolation device 62 has not used the projection flags.

There are several options which could be considered:

Option 1—Ignore the flags completely: maybe the matching criterion is overtaking them or is anyway enough.

Option 2—Use the flags to detect the "holes" in the vector field (the counters are both zero) and switch to a different interpolation type (median).

Option 3—Use the flags to change the matching results (and thus the sigmoid). For example, the matching result could be penalized depending on the number of conflict a vector has.

The post-filter device 77 in the interpolation scheme is supposed to perform something as described in Option 2.

The interpolation device 62 is further operable to average interpolated pixels depending on the vector distance or their divergence and depending on the post match result. If the vectors are identical, they have the same post match result and apparently the distance between the two vectors is zero. Now the weighting function like e.g. the sigmoid graph is applied and the pixel is interpolated using the formula of said weighting function.

When the vectors are not identical anymore, e.g. they diverge, the two matches are different and the distance is non-zero eventually, the two distinct pixels can be interpolated consequently. These two pixels are used to interpolate and eventually generate a final pixel. In case of non-identical vectors, the best post match decides which vector is to be used; either the forward or the backward vector.

The overall effect of the method of the present invention is to perform always temporal averaging, which, in case of bad vectors, will result in temporal blur. Advantageously, some sort of spatial filter might be anyway necessary in some critical areas.

The complex motion filter device 78 is an adaptive low-pass, spatial filter, that detects areas with critical vectors based on projection flags, post match results, vectors length, etc. and filters vectors and/or interpolated pixels accordingly in case the interpolation device 62 provides not useful results.

Another possible option is to always average the forward and backward interpolated pixels. That is, instead of selecting one of the two interpolated pixels based on the block match result, both pixels are selected, sigmoid weighted and averaged.

In case the forward and backward vectors are similar, i.e. their distance or difference is relatively low; this is equivalent to a spatial filtering.

Figure 10:
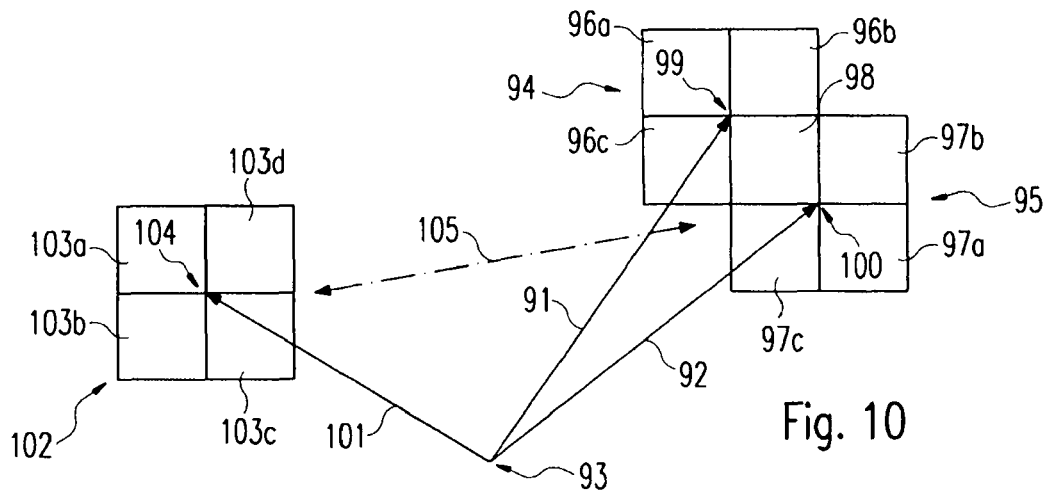
FIG. 10 shows another example of a block being addressed by different vectors.

A problem might arise in case the two vectors are diverging as shown in FIG. 10, since in this case the considered video areas might be completely uncorrelated. Usually this could lead to double structure artefacts, specifically when two objects or an object and the background, are moving in opposite directions, one over the other.

One possible solution would be to use the vector distance/difference as an indicator of this situation and weight the average of the two candidates (forward/backward) depending on this distance/difference.

Specifically when the vectors are close, the average is taken, and as they diverge, the best match is taken.

This will result in another linear interpolation, where the weight is distance dependent and the taps are ordered by best match.

$$w(d) = \min(d, \max\_d) \cdot s$$

The distance has to be clipped and scaled. Already small differences might lead to high uncorrelated areas.

$$y(w) = x_{best} \cdot w + x_{other} \cdot (1-w)$$

The final interpolation is the usual linear interpolation.

This approach still could show the problem that, from pixel to pixel, the different weights (sigmoid and distance) might change too abruptly.

One possible further improvement would be to calculate all the weights in advance, filter them, usually low-pass, and then use for the final interpolation.

FIG. 8 shows an example of a diagram 81 for determining the weighting factor based on the post-match result and the interpolation position. The diagram 81 comprises the Y-axes 83 for the weighting factor and the X-axes 82 for the interpolation position.

The X axis represents the interpolation position and the different curves belong to different matching results. The y axis is the weight result. The diagram further shows four different graphs 84a, 84b, 84c and 84d, whereby the graph 84d has the highest slope and converges to y=1 in the direction of x→0 and to y=0 in the direction of x→1. The other graphs tend also to converge to y=1 and y=0, respectively, but might be further away from said y-values at x=0 or x=1, respectively, due to the slope. All the graphs 84*a* to 84*d* intersect at the point 85 which is positioned at the interpolation position x=0.5 and gives the weighting factor y=0.5.

The higher the post-match result, the higher the slope of the graph and the faster the graph converges to y=1 and y=0 in the respective directions. A higher post-match result means that the original pixels badly fit to the target pixels. In the ideal case, the post match result is zero, meaning the values of the original pixels match or correspond to the values of the target pixels, so that the graph is a horizontal line at y=0.5 for all x-values from 0 to 1, said x-values corresponding to the range between the two source frames.

Figure 9:
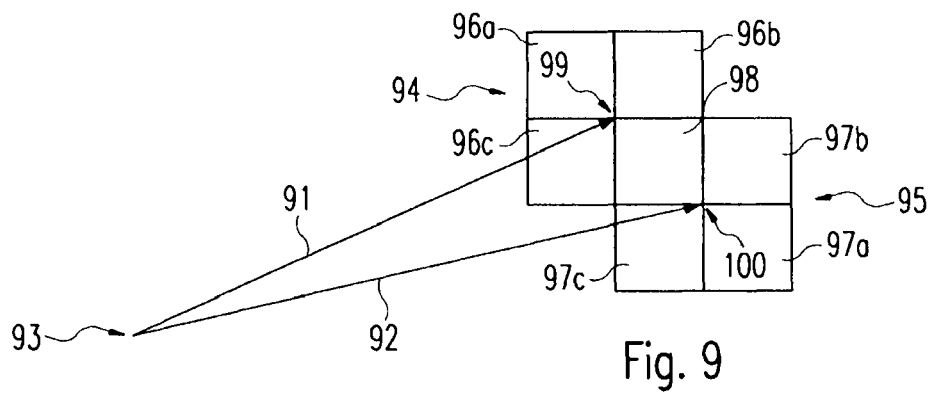
FIG. 9 shows an example of a block being addressed by two different vectors.

FIG. 9 shows an example of two blocks being projected by two different vectors, respectively. The projection is provided by the two vectors 91 and 92 originating from point 93 to point of contact 99 and 100 of the blocks 94 and 95, respectively; thus said vectors 91 and 92 address said blocks 94 and 95, respectively.

Since said two vectors 91 and 92 represent a forward and a backward vector, respectively, the common point 93 is rendered to point out the different directions of the two vectors 91 and 92 and does not mean, that the two vectors 91 and 92 start from the same frame.

Eventually the two vectors 91 and 92 are diverging and are considered in particular in the complex motion filter 78 of FIG. 7. One vector is a forward projected vector and the other one is a backward projected vector.

The block 94 of the vector 91 comprises the pixels 96*a* to 96*c* and the pixel 98. The block 95 of the vector 92 comprises the pixels 97*a* to 97*c* and the pixel 98. The pixel 98 is both part of the blocks 94 and 95, meaning that the two blocks 94 and 95 overlap each other. In the end, the pixel 98 is an averaged or interpolated pixel of two different pixels which originates from the pixel value projected by the forward vector and from the pixel value projected by the backward vector. The blocks 94 and 95 comprise a 2×2 pixel area but could also use 4×4 or 4×2; since the post-match uses also 2×2, this setting is more convenient and thus favourable.

In case the vectors are close but not identical as shown in FIG. 9, the result of this averaging of the pixels of these vectors is comparable with a low-pass filter effect.

FIG. 10 shows another example of a block being projected by different vectors whereby FIG. 10 comprises all the features shown in FIG. 9 and in addition the vector 101 originating from point 93 to the point of contact 104 with its block 102. The block 102 comprises the pixels 103*a* to 103*d*, whereby the distance and direction of block 102 to block 95 is indicated by vector 105.

In this example, the vectors 91 and 101 are vectors of the same direction, e.g. forward projected vectors. It shows that while the vector 91 points to the block 94, which is correlated with the block 95 of the vector 92 in view of the common pixel 98, the block 102 of the vector 101 is not correlated with said block 95.

Based on the distance between the forward and the backward vectors indicated by the vector 105, a weighting factor w is calculated. Is the distance indicated by the vector 105 larger than a predetermined or selectable threshold value, the interpolated pixel value of the vector with the best post-matching is selected for the coordinate at the interpolation position. Is the distance indicated by the vector 105 below said threshold value, the pixel value is based on the interpolated pixel values of both the forward and the backward vector. In particular, the pixel value is calculated based on the weighting factor w, the pixel value of the best post-match and the pixel value of the other post-match according to the following formula:

$$y(w) = x_{best} \cdot w + x_{other} \cdot (1-w)$$

It is clear that this threshold value is based on the distance between said forward and backward vector, on the interpolation position as well as on the size of the block or pixel area being projected. Favourably, the weighting factor w ranges from 0.5 to 1, is dependent on said distance d, said predetermined or selectable threshold value max_d and said scaling factor s as mentioned in the formula:

$$w(d) = \min(d, \max\_d) \cdot s$$

FIG. 11 shows an example of a frame rate conversion device 113 comprising an embodiment of the present invention. The frame rate conversion device 113 comprises a motion estimation device 111 and a motion compensated interpolation device 112, whereby the motion compensated interpolation device 112 comprises a vector projection device 61 and an interpolation device 62.

The frame rate conversion device 113 is operable to receive and process a video signal comprising frames, the conversion rate and other data, which is of a specific relevance for the conversion. Eventually the frame rate conversion device 113 outputs a video signal comprising at least the additional interpolated frames.

The motion compensated interpolation device 112 comprises all the features described and shown by the motion compensated interpolation device 50 in FIG. 6.

The motion estimation device 111 is operable to receive and process the data of the frames 63 and 64, said data being the same as described in FIGS. 6 and 7, and to output the forward and backward vectors 67 and 68.

In addition, it has to be mentioned that the devices shown in FIGS. 6, 7 and/or 11 can also represent structures which can be realized by software programming or hardware implementation in integrated circuits.

Figure 12:
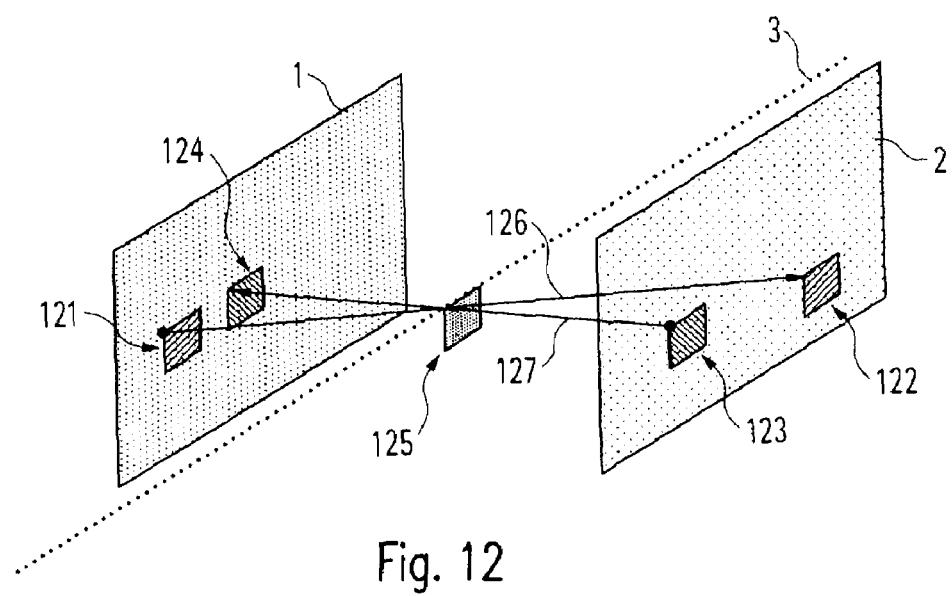
FIG. 12 shows an example of an arrangement of two frames and the forward and backward projection of pixels based on the respective forward and backward vector.

FIG. 12 shows an example of an arrangement of two frames 1 and 2 and the forward and backward projection of the pixels 125, 121, 122, 123 and 124 based on the respective forward and backward vectors 126 and 127. The interpolated pixel/subpixel 125 is at the interpolation position 3 and thus in between the frames 1 and 2 regarding the chronological sequence.

Figure 13:
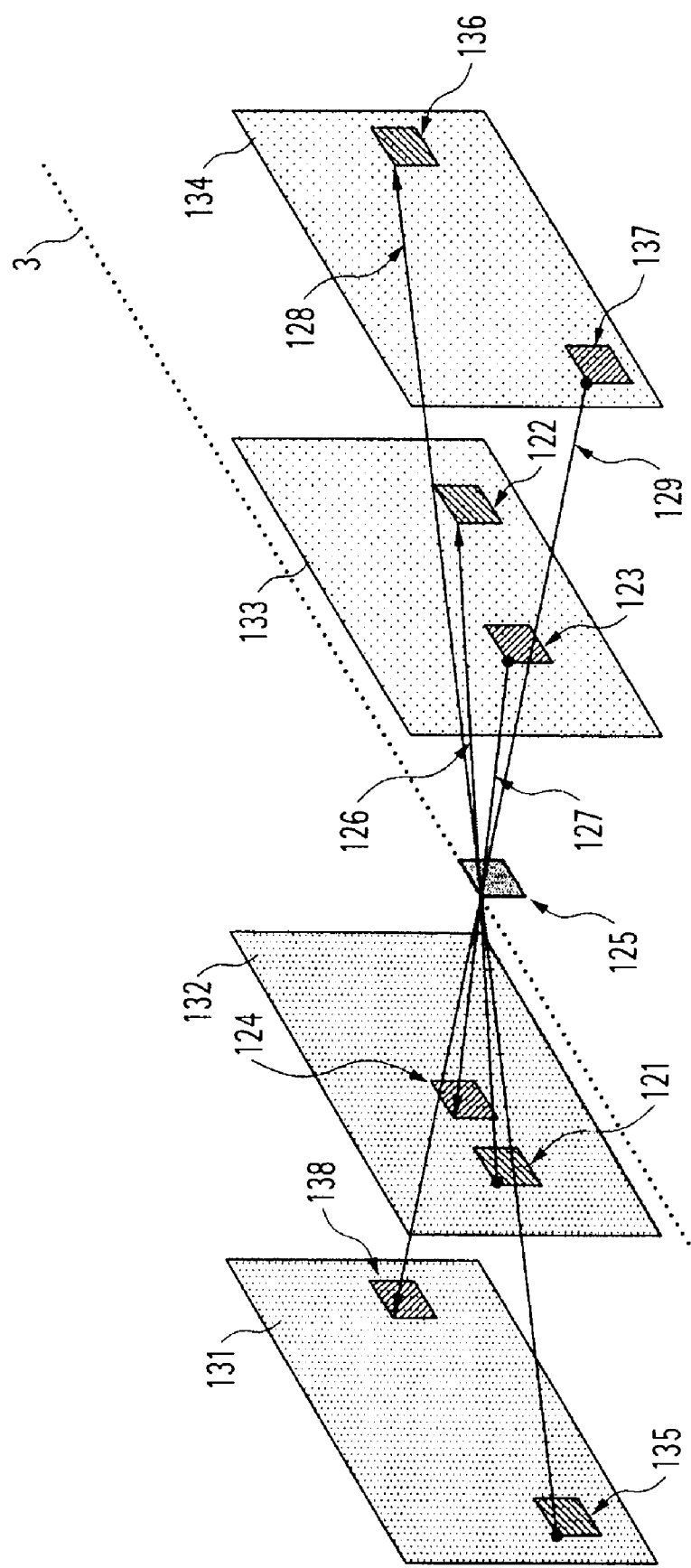
FIG. 13 shows another example of an arrangement of four frames being related with each other by respective forward and backward vectors.

FIG. 13 shows another example of an arrangement of four frames 131 to 134 being related with each other by respective forward and backward vectors 126 to 129, whereby said forward and backward vectors 126 to 129 project at least one pixel or subpixel at the position of the interpolated pixel 125 at the interpolation position 3.

Figure 14:
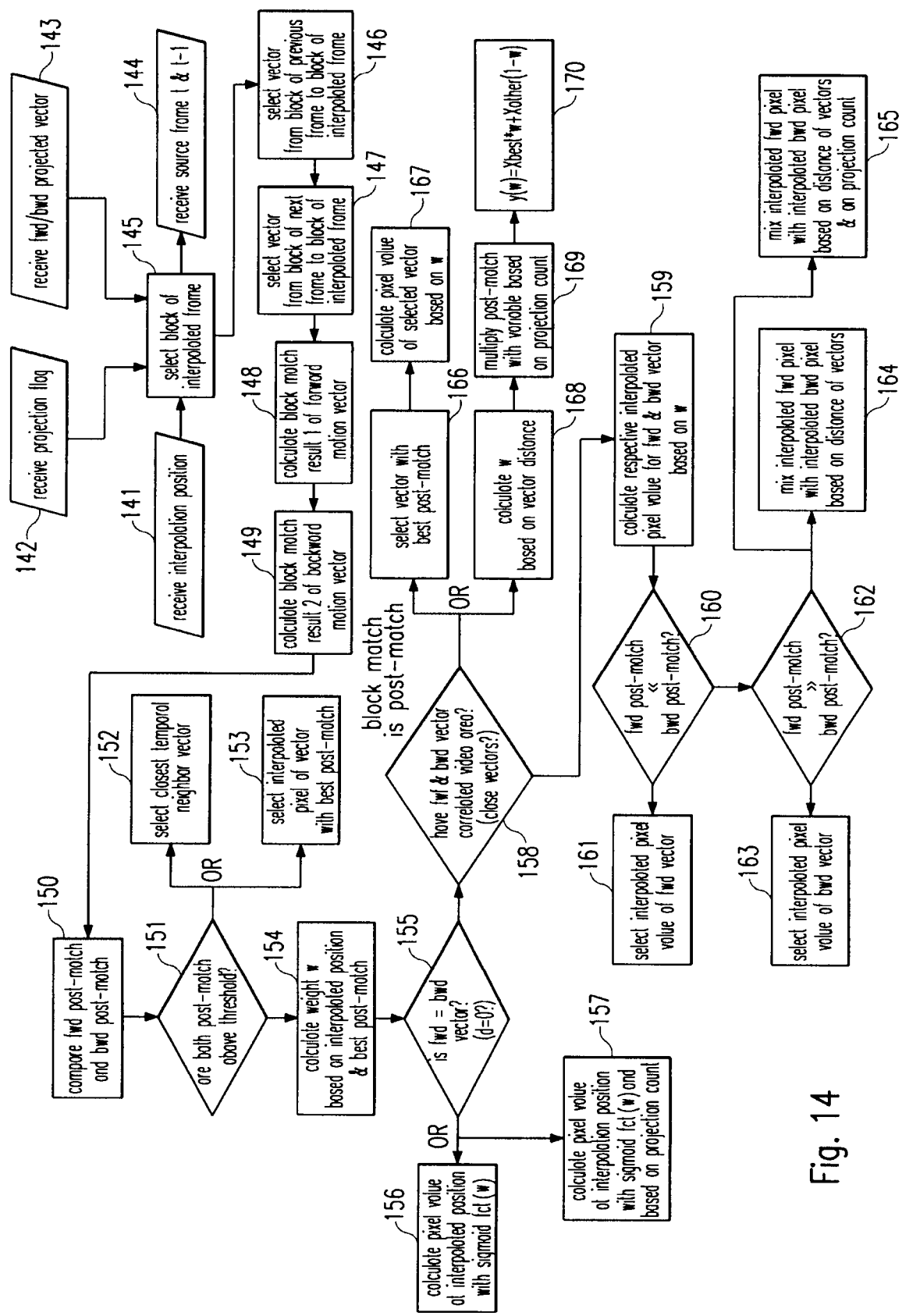
FIG. 14 shows an example of a procedure of the interpolation for determining the value of the interpolated pixel.

FIG. 14 shows an example of a block diagram of an interpolation process. It is clear that the shown example does not restrict the scope of the present invention but merely points towards to the numerous possible embodiments. This block diagram can be processed e.g. in the interpolation device 62 shown in FIGS. 6 and 11, respectively. The whole diagram comprises the steps 141 to 170, which will be explained in detail below. It is emphasized, that the block matching corresponds to the post-matching.

The steps 141 to 144 are input steps for the data comprising the interpolation position, the projection flag, the motion vector data and the source frame data, respectively, and provide input data to the step 145. The data can be manually inputted or received from another device. The data from the steps 141 to 144 can correspond to the data 66, 69, 71 & 72 and 63 & 64 shown in FIG. 6. And the motion vector data can comprise both the projected vectors 71 & 72 as well as the vectors 67 & 68.

In the selecting pixel area—step 145, at least one subpixel or pixel is selected at a spatial coordinate at the interpolation position. Favourably a 2×2 pixel block is selected. After the selection the process continues to step 146.

In the selecting forward projected vector—step 146, the forward projected vector, which is assigned to the respective subpixels or pixels of the selected pixel area, is identified and selected. After step 146 the process continues to step 147.

In the selecting backward projected vector—step 147, the backward projected vector, which is assigned to the respective subpixels or pixels of the selected pixel area, is identified and selected. After step 147 the process continues to step 148.

Based on the forward projected vector previously identified, the respective forward vector is identified to determine the origin and target subpixels' or pixels' values of the origin frame A and of the target frame B, respectively. With the determined pixel values of the origin frame A and the target frame B, a post-match for the forward vector is calculated in the calculating post match—step 148 which can be processed e.g. in the post-matching device 73 in FIG. 7. After step 148 the process continues to step 149.

Based on the backward projected vector previously identified, the respective backward vector is identified to determine the target and origin subpixels' or pixels' values of the target frame A and of the origin frame B, respectively. With the determined pixel values of the target frame A and the origin frame B, a post-match for the backward vector is calculated in the calculating post match—step 149 which can be processed e.g. in the post-matching device 73 in FIG. 7. After step 149 the process continues to step 150.

In the comparison step 150 for comparing the post-match results of the forward and backward vectors, the process identifies whether one post-match result is better than the other one and/or if said results are above a specific threshold value or if said post-match results are equal to each other. Normally the lower the post-match result is, the better do the values of original pixels and target pixel fit with each other. Eventually the comparison step 150 stores the best post-match result in a separate variable. In the FIG. 7, the threshold value can be part of the input data of the steps 141 to 144 or can be inputted during the comparison step 150 (not shown). After step 150 the process continues to step 151.

In the threshold decision 151, the post-match results are compared to said threshold value or according to the already performed threshold comparison in step 150 the process continues either to step 152 or 153, when the post-match results are above said threshold value, meaning the post-match results are both bad, or to step 154, when the post-match results are below or equal to said threshold value. The threshold value describes the quality of the post-match result and can be adapted based on the video signal, its frame rate and/or the overall vector field between the two source frames.

There are different selection mechanisms, in case both post-match results are above the threshold, to continue either to step 152 or step 153. Or both steps can be performed and the results can be compared to each other and to the spatial environment of the coordinate at the interpolation position, respectively. In case one result would be filtered out in view of the surrounding pixels that would indicate that said result is not smooth enough and that the outer result might be more preferable. Or the steps can be selected randomly.

In the selecting closest temporal neighbour vector—step 152, the assigned projected vector of the select pixel at the interpolation position is replaced by the closest temporal neighbour vector and the pixel value is determined based on said neighbour vector.

In the selecting interpolated pixel—step 153, nevertheless the vector with the best post-match is selected and based on the values of the original and target pixels and on the interpolation position the value of the interpolated pixel is calculated. Since the post-match is above the threshold, it might not be necessary to calculate the weighting factor based on the sigmoid function which is shown in FIG. 8.

In the calculating weighting factor—step 154, the weight w is calculated based on the interpolation position and the best post match result as determined in step 150. The calculation is based on the sigmoid function but can be based on any other function which is produces graphs like the sigmoid function, like e.g. the arc tangent, the hyperbolic tangent or the error function, also called Error Gauss Function. After this step the process continues to step 155.

In the equality comparison 155, the forward vector is compared with the backward vector and it is determined whether they are equal, meaning same length and are parallel to each other, or they diverge. It can be also said that the distance between the end points of the shear the two vectors form is zero or not. When they are equal or the distance is zero, the process continues to the step 156 or 157. The decision after step 155 to pick step 156 or 157 is similar to the decision after step 151 mentioned above.

In the calculating pixel value—step 156, the calculation can correspond to the calculation of step 153. Since the forward vector is identical to the backward vector, the original pixel and the target pixel of the forward vector will be the same as the target pixel and the original pixel of the backward vector, respectively. And also the post-match results will be the same. So based on the two pixel values and the weighting factor w previously calculated, the value of the interpolated pixel is determined.

The calculating pixel value—step 157 comprises the process of the step 156 and in addition checks the projection counts of the respective forward and backward projected vectors, whereby the projection count originates from the data of the projection flag. In case the projection count is 0, the respective projected vector is probably e.g. a temporal neighbour vector selected by the vector projection since no vector has been assigned to the coordinate at the interpolation position. In case the projection count is greater than 1, the currently assigned projected vector is an average of different vectors pointing to the coordinate at the interpolation position. Thus in case the projection count for one vector is unequal 1, the other vector's post-match result and pixel values are selected for calculating the value of the interpolated pixel, eventually. Although this step 157 can be redundant, it gets important when the two vectors are not identical and at least one vector is averaged based on the projection count of vectors pointing to the coordinate at the interpolation position.

The projection count is used to weight the block matching results, the idea is that multiple projection, i.e. position with more than one assigned vectors, or no projections at all, should be penalized compared to position with single projection. Typically this could be achieved by multiplying the match result by the projection count, if non zero, or by a higher than one value, if zero.

For the possibility the vectors are not identical, the process continues from step 155 to step 158. In the vector closeness comparison 158, the shear of the forward and backward vector is further checked. Two properties can be checked, whereby the first property measures the distance between the endpoints of the vectors as shown in FIG. 10, and the second property checks the correlated video area selected by the two vectors as shown in FIG. 9. If either the distance is small enough or there exists a correlated video area or both, the two vectors are considered as close vectors. The decision, whether the distance of between the vectors is small enough, can also be based on the projected amount of pixels or in other words on the size of the projected block. If the vectors are considered as close vectors, the process continues to step 159.

In the calculating respective interpolated pixel value—step 159, the interpolated pixel value of the forward and the backward vector based on the respective original and target pixels and the weighting factor w are calculated, respectively. So there exists now an interpolated pixel for the forward vector and an interpolated pixel for the backward vector at the same coordinate of the interpolation position. The weighting factor w is either based on the respective post-match result of the forward and backward vector or on the best post-match result. After step 159 the process continues to step 160.

In the first forward/backward post-match comparison 160, it is checked whether the forward post-match is much smaller than the backward post-match. If this is the case, the process continues to step 161 where the already calculated interpolated pixel of the forward vector is selected for the selected coordinate at the interpolation position. Otherwise the process continues to step 162.

In the second forward/backward post-match comparison 162, it is checked whether the backward post-match is much smaller than the forward post-match. If this is the case, the process continues to step 163 where the already calculated interpolated pixel of the backward vector is selected for the selected coordinate at the interpolation position. Otherwise the process continues to step 164 or 165.

For the comparison whether one post-match is much smaller than the other one, a predetermined factor can provide a threshold. This threshold can be based e.g. on the size of the projected block.

Furthermore, the decision to further proceed to step 164 or 165 is similar to the decision mentioned above after step 151.

If the process continues to step 164 or 165, it is clear that the forward vector and the backward vector are defined as "close" to each other and that their respective post-match result is equal or similar to each other.

In the first mixing forward/backward pixel—step 164, the final interpolated at least one subpixel is calculated by weighting the two interpolated pixel values of step 159 based on the distance of the vectors to each other. The greater the distance, the better for the interpolated pixel of the one vector with the better post-match result, meaning in the mix the value of said pixel is dominating the value of the other pixel of the vector with the worse post-match result.

The second mixing forward/backward pixel—step 165 comprises the same procedure as described in step 164 and in addition introduces the projection count as criteria in the mixing of the final interpolated pixel. This criterion is the same as mentioned in step 157. Is the projection count of one projected vector smaller but at least one compared to the projection count of the other projected vector, then the interpolated pixel with the smaller projection count dominates the mixed final interpolated pixel. The criteria regarding the projection count is especially used when the post-match results of the forward and backward vector are equal, because having a coordinate assigned with a single projected vector is more important than none or a plurality of vectors.

It should be mentioned that while the branch of the steps 159 to 165 in the diagram requires at least four pixels, meaning one original pixel and one target pixel of at least one forward vector and one original pixel and one target pixel of at least one backward vector, the branch of the steps 156 and 157 requires only one original pixel and one target pixel, since the forward vector is identical to the backward vector.

If the forward vector and the backward vector are not close as defined and controlled in step 158, the process continues to the step 166 or to the step 168. The decision to pick a specific step is similar to the one after step 151.

In the selecting vector—step 166, the vector with the best post-match is selected. In the following calculating pixel—step 167, an interpolated pixel is calculated based on the selected vector and the weighting factor w.

In the calculating weighting factor—step 168, the distance between the two vectors is calculated which eventually determines that the further away the vectors are from each other, the more dominant the interpolated pixel of the vector with the best post-match will be. After step 168 the process continues to step 169.

In the multiplying post-match—step 169, the post-matches are multiplied with a factor which is based on the projection count of the respective projected vector. As already mentioned above, the projected vector provided by the vector projection might be a result of a number of motion vectors eventually averaged. Nevertheless, it is better to have only one projected vector assigned to a specific coordinate at the interpolation position than zero or more than one projected vectors; thus said factor is determined accordingly to benefit the less projected vectors e.g. the post-match is multiplied with the number of projection counts, whereby in case of zero projection counts the post-match is multiplied by ten. After step 169 the process continues to step 170.

In the calculating pixel value—step 170, the formula $y(w) = x_{best}*w + x_{other}(1-w)$ is utilized, whereby $x_{best}$ stand for the interpolated pixel with the best post-match and $x_{other}$ stand for the interpolated pixel with the worse post-match.

Now the present invention is described in another stringent manner for further clarification. The process of frame rate conversion in the present invention can consist of two separate parts.

The first part is the motion estimation and is performed e.g. by the motion estimation device 111 described in FIG. 11. The motion estimation runs at input frame rate speed and in a bi-directional fashion. Being the estimation process bi-directional, there are always, for each frame pair (A, B), two vector fields describing the motion from A to B and from B to A, called "forward" and "backward" vector fields. The vectors produced describe the motion, in the video signal, in a block based mode, i.e. for each block of a certain given size (like 8×8 or 8×4 or 16×16), in a given frame, a motion vector is assigned pointing to the position of the given block in an other frame. In more detail, the motion estimation provides motion vectors which are intended to copy a specific block from frame A to B or vice-versa instead of maintaining the pixel values of the respective frame.

The second part of the process of the frame rate conversion is the motion compensated interpolation, which runs at the output frame rate. An example can be seen in FIG. 11 as the motion compensated interpolation device 112. The principle is that, for each pixel or group of pixels, in a specific spatial-temporal position, the appropriate corresponding values are produced, taking into consideration the two source frames (A, B) and the given motion in that position and coordinate, respectively.

This second part could further be divided into two blocks: vector projection and interpolation. The vector projection and the interpolation are performed e.g. by the vector projection device 61 and the interpolation device 62, respectively, both shown in FIG. 11.

The first block, vector projection, given a spatial-temporal position, searches which of the given vectors describes a motion trajectory crossing the given position, i.e. which part of the source frames is passing at this position. In other words, the given vectors are projected from the previous or next frame position to the interpolation coordinate and accumulated in the projection buffer of the specific position. Being the vectors assigned to blocks of a certain size, for example 8×8, it is clear that each vector covers an area larger than a single pixel, called "projection window". In other words, since a single vector represents a picture block of a certain area, not only 8×8, but also 8×4, 16×16, etc., it covers the projection space with a window of block size. All the interpolation coordinates which belong to the window have the same projected vector.

This window could be virtually enlarged, i.e. it could be considered covering more than 8×8 pixels, it could be, for example, cover 10×10 pixels. The idea, in this case, is to be able to assign some vectors also in positions where vectors will be never assigned by considering a slightly larger window, for example one pixel in all directions, in order to avoid small gaps between projected vectors, e.g. in order to reduce the probability of areas without vectors at all. Clearly a distinction should be made between the "standard window" (8×8) and "extended window" (10×10), so that when the first matches the position, the second (from different vectors) will not be considered anymore.

For each given spatial-temporal position, the projected vectors are accumulated and counted, then, when the process is finished, the vectors are combined, for example averaged, and the complete information regarding the averaged vectors and their counted number is passed to the next block, the interpolator. The number of accumulated vectors, e.g. conflicting vectors, can also be counted, in order to be able to recover a proper value later. It is worth to mention that, in case a certain position will not have any projected vectors, even in the "extended window" case, it could be filled with zero vectors or with "old" vectors coming from some previous projection (spatially or temporally).

This process is done for both forward and backward vectors and produces two separate outputs as well.

The vector projection algorithm and vector preparation is another example, the present invention can be based on, said vector projection algorithm relies on several spatial filters, involving relatively large 2D matrices, in order to produce a proper projected vector buffer.

In the other example of a projection algorithm explained above other properties of the vector fields and the requirements of the projected one are considered and spatial filters can be converted into "temporal" ones.

The interpolator block receives the projected vectors, forward and backward, together with the projection count information. At this point, it uses the given vectors information, in the given spatial-temporal position, to read the video data in the two given source frames. This operation is done, again separately, for the forward and backward case and it consists in reading a certain number of pixels, for example an area 2×2 or 3×3 or 4×4 or other sizes or shapes, pointed by the vectors belonging to the current interpolation position (spatial-temporal). This means reading a 2×2 (or 3×3 or 4×4) area from frame A and B using the forward vectors and the same using the backward vectors, resulting in 4 small blocks.

Since the vectors can point to non-integer position, these blocks are also used to perform a sub-pixel spatial interpolation, i.e. for each small 2×2 (or 3×3 or 4×4) area a pixel value is calculated, depending on the exact pointing position of the corresponding vector for this area.

These small blocks are also used to perform the so called "post-match", i.e. a matching process is performed between the blocks addressed by the same vector (forward and backward). This means, that the two small blocks being linked by the respective forward (backward) vectors are matched with each other, i.e. the sum of absolute pixel difference (or sum of square difference or correlation or similar) is calculated. This leads to two "quality" values, one for the forward and one for the backward vectors. Usually the lower the value, the better the vector. Thus, the post-match procedure corresponds to the block match procedure.

In this part of the process, the projection count is used to weight the block matching results, the idea is that multiple projection, i.e. position with more than one assigned vectors, or no projections at all, should be penalized compared to position with single projection. Typically this could be achieved by multiplying the match result by the projection count, if non zero, or by a higher than one value, if zero.

The real interpolation process depends on the given temporal position, i.e. how far from frame A (and B) is the wanted new frame. For example, in case of 25 fps to 50 fps, one position is 0 and the other is 0.5, i.e. one original frame and one interpolated in the middle of two. For the 24 fps to 60 fps case, the positions are something like: 0-0.4-0.8-[0]-0.2-0.6 (the [0] is not part of the interpolation, it is only used to indicate the position of an original frame).

The typical interpolation mechanism is a linear combination of the corresponding, previously calculated, sub-pixels, respectively for the forward and backward case. This combination weights the sub-pixels depending on several factors. Specifically, it takes into consideration position (as described above), post-match result (as described above) and vector consistency. This last parameter describes how "reliable" the vectors are by measuring something like vectors difference or "divergence" (between forward and backward), vectors length, vectors uniformity, etc.

The final interpolation is something like: $P=A_f*C_1+B_f*C_2+A_b*C_3+B_b*C_4$, where $A_f$ is the sub-pixel belonging to frame A and pointed by the forward vector; $A_b$ same frame, but backward vector; $B_f$, B frame and forward vector; $B_b$ same B frame, but backward vector. P is the value returned for the given spatial-temporal position.

The $C_x$ coefficients are calculated or extracted from a LUT (Look-Up-Table) using the above mentioned parameters.

The $C_x$ are assigned to each interpolation spatial position. Due to several reasons, it could be that the coefficients are changing too abruptly from position to position, thus a spatial low-pass filter is performed on the coefficients, before using them for the final linear combination.

A possible example of the above linear combination is as follow. First of all, forward and backward sub-pixels are considered separately, so two separate set of coefficients are calculated or extracted from a LUT. These depend on the interpolation position and post-match result. Also, these will be filtered as mentioned above.

They will be:

$$P_f = A_f \cdot K_f + B_f \cdot (1.0 - K_f)$$

$$P_b = A_b \cdot K_b + B_b \cdot (1.0 - K_b)$$

The meaning of the symbols is the usual as described above.

In this case $K_x$, could simply be the position, i.e. $K_x$=pos, thus leading to a simple linear interpolation.

As mentioned above, it is wiser to take into consideration the post-match result. The point here is that the higher is the post-match, the less linear should be the interpolation. Ideally, if the match is bad (high value), a pixel copy operation should take place, i.e. taking only $A_x$ or $B_x$, while if the post-match is very good (low value, zero is the perfect case), a linear interpolation is the best choice.

One possible method is to use a family of sigmoid functions. The different functions are selected, or generated, from the post-match result; the value of the chosen sigmoid is a function of the interpolation position.

This leads to something like:

$$K_x = s/(1.0 + e^t)$$

where $t = -(h*\text{pos}*\text{match} - j*\text{match})$ and where (s,h,j) are normalizing factors, scaled and signed so that the $K_x$ range will be consistent with the wanted curve shape, total allowed range (0.0 to 1.0) and implementation method (float, integer).

Of course this function could be approximated in several ways, like a variable slope "linear" equation (y=m*x+q), with clipping.

As well, this could be the output of an appropriate LUT (Lookup Table).

Note that the sigmoid could be done in a way so that for position 0.5 the output will always be 0.5, independent from the post-match result, which leads to have always a 50% average in the most critical interpolation position.

The two $P_x$ generated pixels need now to be combined. One simple option could be to pick up the one which has the best (lower) post-match result. While this is a straightforward option, it could cause hard switching artefacts. Another possibility is to linear combine (again) the two results using the vector consistency measurement (as described above).

This is done based on the following consideration: if the vectors forward and backward are very consistent (ideally they are identical), then the result will be $P = Z*P_f + (1.0-Z)*P_b$, with $Z=0.5$, i.e. the two values are simple averaged.

If the vectors are completely inconsistent, Z will be 0.0 or 1.0, in the above formula, depending on which direction (forward or backward) has the best (lower) post-match result.

Assuming the vector difference (diff) or "divergence" is used as measurement of consistency (always positive value), the coefficient could be:

$$Z_t = \text{diff}*w + 0.5$$

Where (w) is a scale factor, which sign depend on the post-match comparison or difference, between the forward and backward ones.

For example, if the forward post-match is better than the backward (w) will be positive, so that $Z_t$ will be between 0.5 and 1.0, thus weighting more the forward interpolated value. Finally, $Z=\text{clip}(Z_t)$, between 0.0 and 1.0. This means that Z is the clipped version of $Z_t$.

The $K_x$, and Z coefficient will be, as mentioned above, spatially low-pass filtered in order to produce smother selection criteria.

Of course, the $K_x$, and Z could be recombined in order to achieve the $P = A_f*C_1 + B_f*C_2 + A_b*C_3 + B_b*C_4$ formula, with something like:

$$C_1 = Z*K_f$$

$$C_2 = Z*(1.0 - K_f)$$

$$C_3 = (1.0 - Z)*K_b$$

$$C_4 = (1.0 - Z)*(1.0 - K_b)$$

In other terms, an adaptive filtering will produce the interpolated output, using as input the 4 extracted sub-pixels and, as adaptation mechanism, picture and vector quality measurements.

A simplified version could be realized by passing directly the vectors from the motion estimation to the interpolator block, skipping the projection and setting the counters to a fixed value of 1. In this case a light vector pre-processing, like block erosion or low-pass, or both, could be applied in order to provide smoother vector fields.

The main advantages of this method is that said method is relatively simple and can be implemented in a memory and a computational constrained system.

It has practically no hard switching occurring in standard conditions. In this way many artifacts caused by this behavior are avoided.

For the above reason, it is inherently robust to soft and hard picture changes, like fading or scene change. So many workarounds used for these cases could be also avoided or reduced.

Filtering the coefficients, instead of the final video signal, allows a uniform processing, since it avoids selecting which video areas have to be filtered and which not.

Eventually the method or the structures above mentioned and necessary to interpolate said subpixel can be implemented in different devices like e.g. television devices, beamers, display devices or any device capable to display pictures or movies. Of course, the device can also be an adapter operable to receive a video signal, covert the frame rate by interpolation and output the interpolated video signal to a display device like e.g. in a satellite receiver. Or the subject-matter of the present invention could be part of a camera, which immediately converts the frame rate of the recorded video signal.

The method or the structures of the apparatus can also be implemented in a software code or program operable on an operating system like Windows Vista or Symbian OS. Moreover, the method or the structures of the apparatus can be implemented as an embedded structure in an integrated circuit (IC), whereby the transistors of the IC are constructed and interconnected to properly perform the interpolation with or without programming of the IC. The structures can be implemented as separate units in different ICs, whereby the ICs would eventually be interconnected with each other in a specific way to properly perform the interpolation.

The method or the structures can be part of a simulation or an emulation which is based on software programming.

REFERENCE NUMBERS 1 frame t−1
2 frame t
3 projection coordinate
4 projection window 1
5 projection window 2
6 conflicting area
7 vector 1
8 vector 2
9 starting point of vector 1
10 starting point of vector 2
11 point of contact of vector 1 with projection window 1
12 point of contact of vector 2 with projection window 2
13 ending point of vector 1
14 ending point of vector 2
15 vector field
21 block of vector 1
21a extended area of block of vector 1

22 block of vector 2
22*a* extended area of block of vector 2
23 block of vector 3
23*a* extended area of block of vector 3
24 projection line
25 line of availability of vector 1
25*a* line of priority of vector 1
26 line of availability of vector 2
26*a* line of priority of vector 2
27 line of availability of vector 3
27*a* line of priority of vector 3
28 projection—conflict line
28*a* single projection of vector 1
28*b* conflict between vector 1 and vector 2
28*c* single projection of vector 2
28*d* conflict between vector 2 and vector 3
28*e* single projection of vector 3
A1-A9 section of projection line
31 block of vector 1
31*a* extended area of block of vector 1
32 block of vector 2
32*a* extended area of block of vector 2
33 block of vector 3
33*a* extended area of block of vector 3
34 gap between block of vector 2 and block of vector 3
35 middle overlap—conflict of vector 2 and 3
36*a* upper overlap—conflict of extended area of vector 2 and 3
36*b* right overlap—conflict of extended area of vector 2 and block of vector 3
36*c* lower overlap—conflict of extended area of vector 2 and 3
36*d* left overlap—conflict of extended area of vector 3 and block of vector 2
37 block of vector 4
37*a* extended area of block of vector 4
38 first projection line
39 second projection line
40 third projection line
41 three vector conflict area
B1-B14 section of projection line
50 motion compensated interpolation device
61 vector projection device
62 interpolation device
63 frame t
64 frame t−1
65 interpolated frame
66 interpolation position
67 forward vector
68 backward vector
69 projection flag
70 mode control device
71 forward projected vector
72 backward projected vector
73 forward/backward block post-matching device
74 vector selection device
75 sub-pixel access
76 adaptive interpolator
77 post filter
78 complex motion filter
81 weighting function
82 x-axis (interpolation position)
83 y-axis (weighting factor)
84*a-d* sigmoid graph with different post matching values
85 intersection of all graphs
91 vector 1
92 vector 2
93 origin
94 block of vector 1
95 block of vector 2
96*a-c* pixel of block of vector 1
97*a-c* pixel of block of vector 2
98 pixel of block of vector 1 and of block of vector 2
99 point of contact of vector 1 with its block
100 point of contact of vector 2 with its block
101 vector 3
102 block of vector 3
103*a-d* pixel of block of vector 3
104 point of contact of vector 3 with its block
105 distance indicator
111 motion estimation device
112 motion compensated interpolation device
113 frame rate conversion device
121 origin pixel of forward vector
122 target pixel of forward vector
123 origin pixel of backward vector
124 target pixel of backward vector
125 interpolated pixel/subpixel(s)
126 forward vector
127 backward vector
128 second forward vector
129 second backward vector
131 first frame
132 second frame
133 third frame
134 forth frame
135 origin pixel of second forward vector
136 target pixel of second forward vector
137 origin pixel of second backward vector
138 target pixel of second backward vector
141 receiving interpolation position—step
142 receiving projection flag—step
143 receiving motion vector data—step
144 receiving source frame data—step
145 selecting pixel area—step
146 selecting forward projected vector—step
147 selecting backward projected vector—step
148 calculating post-match of forward motion vector—step
149 calculating post-match of backward motion vector—step
150 comparing forward post-match with backward post-match—step
151 threshold comparison
152 selecting interpolated pixel based on closest temporal neighbour vector—step
153 selecting interpolated pixel of vector with best post-match—step
154 calculating weighting factor—step
155 equality comparison
156 calculating pixel value based on sigmoid—step
157 calculating pixel value based on sigmoid & projection count—step
158 vector closeness comparison
159 calculating respective interpolated pixel values based on w—step
160 fwd post-match smaller bwd post-match comparison
161 selecting interpolated pixel of fwd vector—step
162 fwd post-match larger bwd post-match comparison
163 selecting interpolated pixel of bwd vector—step
164 mixing fwd & bwd pixel based on distance—step
165 mixing fwd & bwd pixel based on distance & projection count—step
166 selecting vector based on best post-match
167 calculating pixel of selected vector based on w—step
168 calculating w based on vector distance—step 169 multiplying post-match based on projection count—step
170 calculating pixel value based on given formula—step

The invention claimed is:

1. A method for interpolating at least one subpixel at an interpolation position, said interpolation position being situated in the chronological sequence between at least two source frames, whereby said at least two source frames comprise a plurality of pixels and/or subpixels, respectively, and are correlated with each other based on at least one forward motion vector and at least one backward motion vector, said forward and backward motion vector pointing from at least one origin pixel or subpixel of the frame preceding said interpolation position to at least one target pixel or subpixel of the frame succeeding said interpolation position and vice-versa, respectively, said method comprising the steps of identifying at least one of said at least one forward motion vector and at least one of said at least one backward motion vector respectively relating to at least one subpixel at the respective same spatial coordinate at said interpolation position, determining the values of the origin and target pixels or subpixels pointed by said identified motion vectors, respectively, and calculating the value of said at least one subpixel at said spatial coordinate based on said values of origin and target pixels or subpixels of said identified motion vectors and based on respective weighting coefficients, said weighting coefficients being based on attributes of said identified motion vectors.

2. A method according to claim 1, wherein said attributes comprise a post-match result of said origin and target pixels of the forward and/or backward motion vector, respectively.

3. A method according to claim 2, wherein said post-match result is the best, when said origin and target pixels or subpixels are identical.

4. A method according to claim 1, wherein said weighting coefficients are based on said interpolation position, respectively.

5. A method according to claim 1, wherein said weighting coefficients are based on a sigmoid shaped function, respectively.

6. A method according to claim 1, wherein said attributes comprise the divergence between said forward and backward vectors.

7. A method according to claim 1, wherein said weighting coefficients are processed based on a projection count, respectively, said projection count representing the respective number of forward or backward vectors at said spatial coordinate of said interpolation position.

8. An apparatus for interpolating at least one subpixel at an interpolation position, said interpolation position being situated in the chronological sequence between at least two source frames, whereby said at least two source frames comprise a plurality of pixels and/or subpixels, respectively, and are correlated with each other based on at least one forward motion vector and at least one backward motion vector, said forward and backward motion vector pointing from at least one origin pixel or subpixel of the frame preceding said interpolation position to at least one target pixel or subpixel of the frame succeeding said interpolation position and vice-versa, respectively, said apparatus being operable to receive at least one of said forward and said backward motion vector, at least said two source frames and said interpolation position and to output said interpolated at least one subpixel at said interpolation position, said apparatus comprising an identification structure operable to identify at least one of said at least one forward motion vector and at least one of said at least one backward motion vector respectively relating to at least one subpixel at the respective same spatial coordinate at said interpolation position, a determination structure operable to determine the values of the origin and target pixels or subpixels pointed by said identified motion vectors, respectively, and a calculation structure operable to calculate the value of said at least one subpixel at said spatial coordinate based on said values of origin and target pixels or subpixels of said identified motion vectors and based on respective weighting coefficients, said weighting coefficients being based on attributes of said identified motion vectors.

9. An apparatus according to claim 8, wherein said attributes comprise a post-match result of said origin and target pixels of the forward and/or backward motion vector, respectively.

10. An apparatus according to claim 9, wherein said post-match result is the best, when said origin and target pixels or subpixels are identical.

11. An apparatus according to claim 8, wherein said weighting coefficients are based on said interpolation position, respectively.

12. An apparatus according to claim 8, wherein said weighting coefficients are based on a sigmoid shaped function, respectively.

13. An apparatus according to claim 8, wherein said attributes comprise the divergence between said forward and backward vectors.

14. An apparatus according to claim 8, wherein said weighting coefficients are processed based on a projection count, respectively, said projection count representing the respective number of forward or backward vectors at said spatial coordinate of said interpolation position.

* * * * *